United States Patent
Cornell

[11] 3,842,268
[45] Oct. 15, 1974

[54] DRIVE SYSTEM FOR AUTOMATIC METER READER

[75] Inventor: Edward P. Cornell, Schenectady, N.Y.

[73] Assignee: General Electric Company, Schenectady, N.Y.

[22] Filed: Sept. 17, 1973

[21] Appl. No.: 397,936

[52] U.S. Cl............. 250/231 SE, 324/175, 340/190
[51] Int. Cl. ............................................ G01d 5/34
[58] Field of Search .......... 250/231 R, 231 SE, 237; 324/96, 175; 340/189, 190, 195, 347

[56] References Cited
UNITED STATES PATENTS
| | | | |
|---|---|---|---|
| 2,977,480 | 3/1961 | Keene | 324/175 |
| 3,525,094 | 8/1970 | Leonard | 250/231 SE |
| 3,689,160 | 9/1972 | Shimulenis | 250/231 SE |
| 3,693,022 | 9/1972 | Dumast | 250/231 R |
| 3,756,122 | 9/1973 | Campbell | 250/231 R |

Primary Examiner—James W. Lawrence
Assistant Examiner—D. C. Nelms
Attorney, Agent, or Firm—Donald R. Campbell; Joseph T. Cohen; Jerome C. Squillaro

[57] ABSTRACT

A remote reading meter register with an optical encoder includes a light source and reflector for illuminating a rotatable scanning disc to obtain read-out signals indicative of the rotational positions of the indicator shafts. An improved low cost scanning disc drive system that fits in the available space utilizes the scanning disc as part of the rotor. The stator of the hollow core hysteresis motor surrounds the reflector and is made of simple nesting components.

8 Claims, 4 Drawing Figures

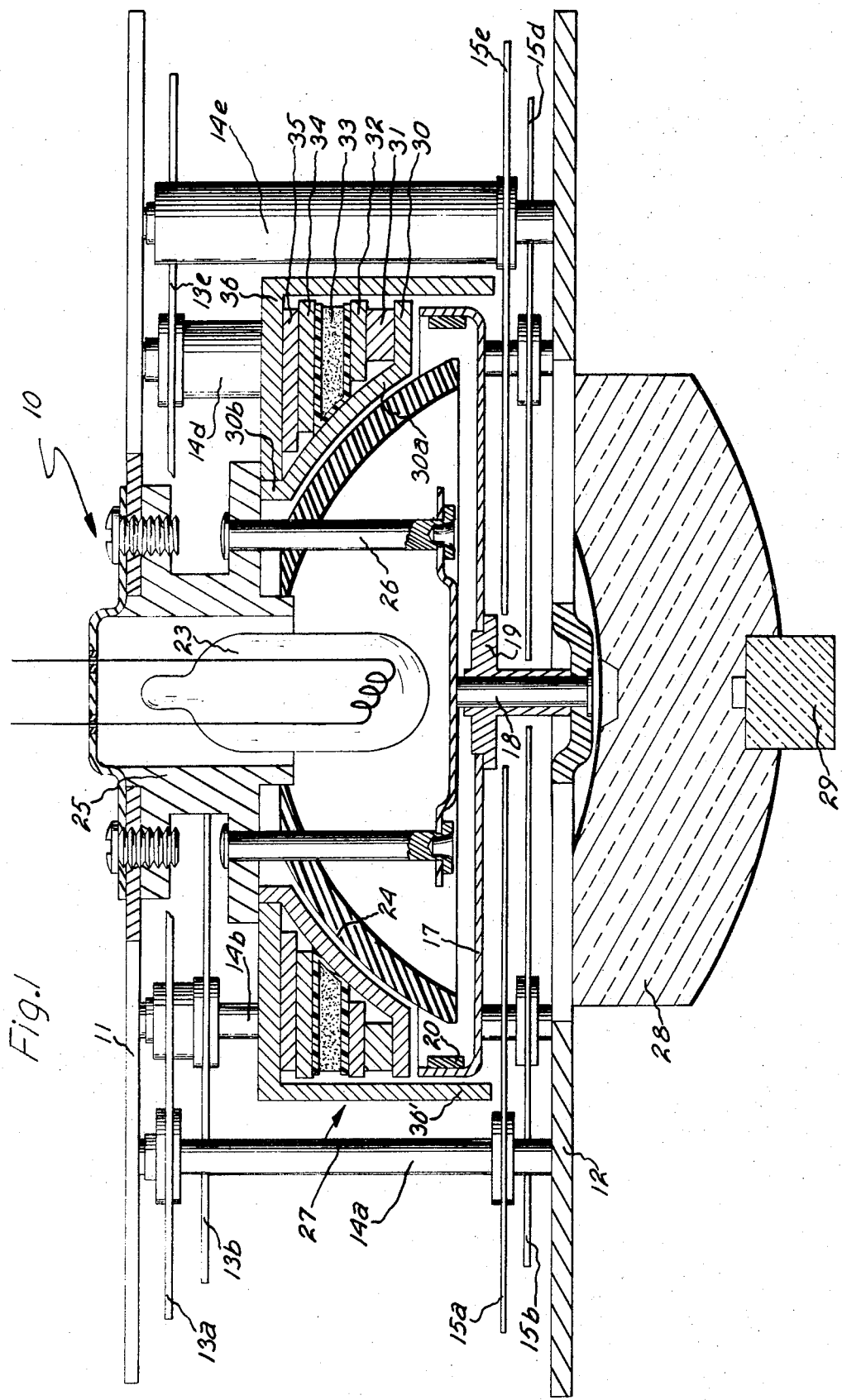

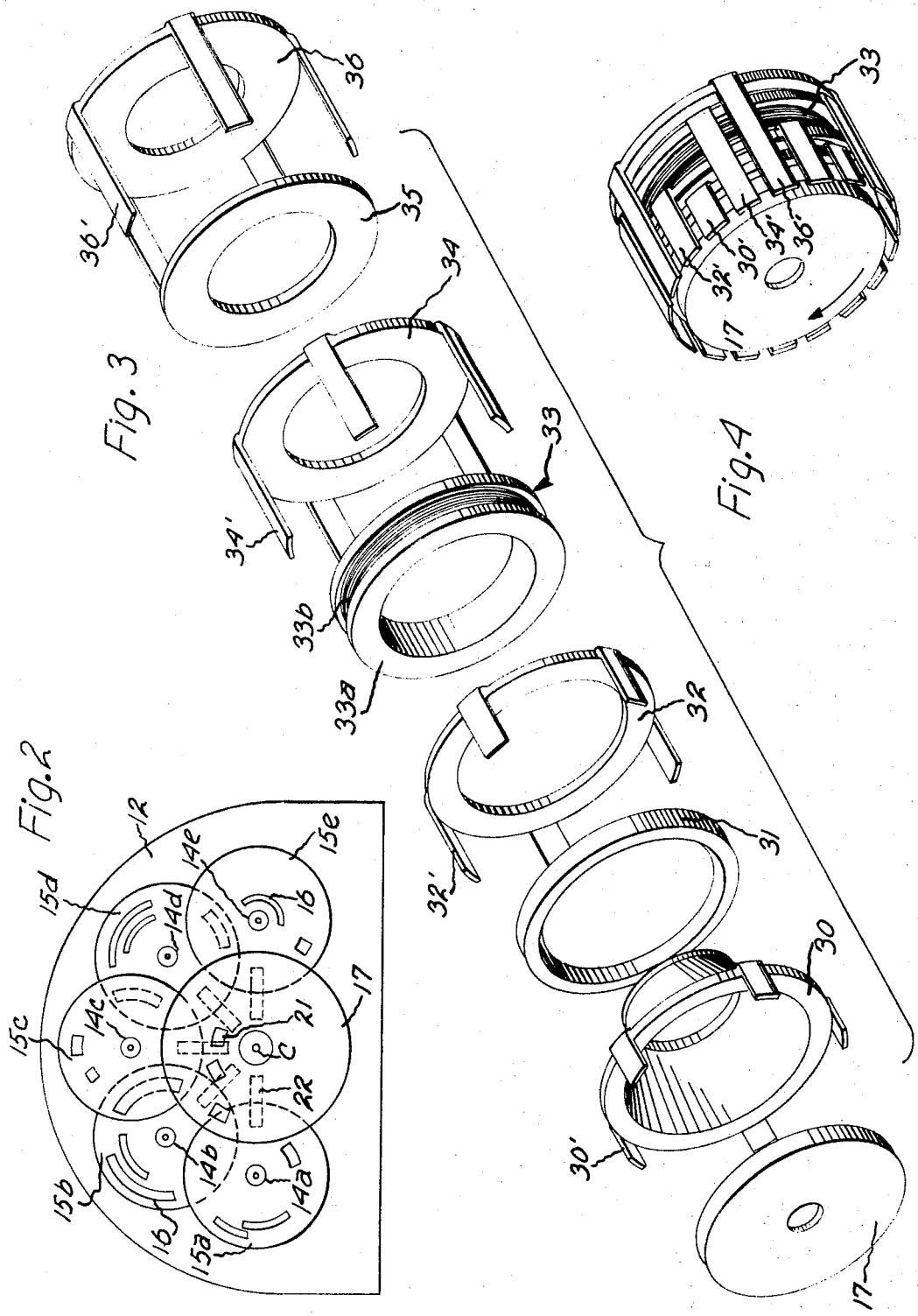

DRIVE SYSTEM FOR AUTOMATIC METER READER

BACKGROUND OF THE INVENTION

This invention relates to a drive system for automatic meter reading equipment in an electricity or other meter. More particularly, the invention relates to a remote reading meter register with an optical encoder arrangement incorporating a low cost hollow core hysteresis motor which utilizes the encoder scanning disc as part of the motor rotor.

Automatic reading meters used by a utility to measure the quantity of electricity, gas, or water delivered to the customer have the advantages of being readable inexpensively and more conveniently as compared to conventional manually read meters. Conventional meters, in addition to requiring a meterman to make monthly or bimonthly rounds, are subject to human error in reading the multi-dialed register and the problem of the customer not being present to give access. A number of automatic meter reader systems have been suggested. One such system that has been developed for remotely reading the meter register uses an optical encoding disc arrangement in conjunction with an optical system and photosensor to produce a train of electrical pulses corresponding to the register indication. The remotely reading register can be actuated on command from a central station using the telephone or power lines to transmit the read-out signal. The optical encoder comprises five discs for a five-digit read-out and includes a scanning disc that is rotated by a motor to scan the discs in sequence, the resulting pulse train being transmitted back to a central computer for recording. This remotely readable register can be provided with dials as in a conventional meter for manual reading.

The foregoing fail-safe, automatically readable meter is disclosed in greater detail in two concurrently filed applications, both assigned to the same assignee as this invention, as follows: Ser. No. 348,513, filed Apr. 6, 1973 by Ansell W. Palmer and Warren R. Germer, entitled "Encoding Remote-Reading Register with Error Detection Capability;" and Ser. No. 348,745 filed Apr. 6, 1973 by John M. Holeman, entitled "Optical System for Automatic Meter Reader." The various parts are arranged compactly as it is desired that the remotely reading register be approximately the same size as present manually readable registers. In the constructions there illustrated, the rotatable scanning disc has peripheral gear teeth meshing with a small pinion gear driven by an externally mounted synchronous motor. The present invention is directed to an improved drive system that is low cost, fits internally within the available space remaining in the crowded optical light source and encoder section of the register, and meets the performance criteria such as short start-up time to synchronous speed.

SUMMARY OF THE INVENTION

In accordance with the invention, the improved scanning disc drive system for a remote reading meter register that is low cost and fits in the available restricted space is essentially a hollow core hysteresis motor which utilizes a cupped scanning disc as part of the rotor. The scanning disc has a cylindrical rim providing a continuous band of high hysteresis loss ferromagnetic material such as a vanadium-cobalt-iron alloy. The stator surrounds the light source and reflector optics, preferably a parabolic reflector member, and comprises a single concentrated excitation winding between a pair of stator lamination and shading ring assemblies provided with orthogonally bent fingers. These fingers are staggered or interleaved to form alternating unshaded and shaded salient stator poles of opposite polarities which are arranged in a ring surrounding the rim of the scanning disc and generate an approximately constant rotating magnetic field. In a preferred construction, the stator is made of four stamped stator laminations and two shading rings that are stacked in the proper order on either side of the excitation winding supported by an integral hollow core on one of the laminations.

During read-out, the scanning disc in addition to other parts of the encoder system is illuminated with collimated light projected by the reflector, and the energized drive system has a fast start-up to synchronous speed. The train of read-out light pulses generated by the rotating scanning disc is used to derive the remotely readable electrical output signal of the encoder system, which is indicative of the rotational positions of the gear-coupled indicator shafts.

BRIEF DESCRIPTION OF THE DRAWINGS

FIG. 1 is a bottom view, partially in cross section, of the main components of the remote reading meter register with an optical encoder read-out, and of the hollow core hysteresis motor constructed according to the invention which surrounds the collimating optics parabolic reflector and utilizes the encoder scanning disc as part of the motor rotor;

FIG. 2 is a schematic elevational view illustrating the spatial arrangement of the encoding discs, central scanning disc, and back plate with radial reading slots;

FIG. 3 is a diagrammatic, exploded perspective view of the hollow core hysteresis motor with shaded poles; and FIG. 4 is a perspective view of the assembled hollow core hysteresis motor.

DESCRIPTION OF THE PREFERRED EMBODIMENT

Although the improved drive system for an automatic meter reader constructed in accordance with the invention is usable with a variety of meters including various types of electricity meters, gas meters, water meters, etc., the preferred embodiment is explained with regard to a watt-hour meter suitable for residential service. The register section of the watt-hour meter is provided with an optical meter reader encoder for remote read-out capability, but also includes a conventional gearing arrangement that rotates a series of dials, one for each digit, for visual or manual readout. While this is desirable for fail-safe operation, its inclusion from the standpoint of this invention is optional. Also, the mechanism within the meter which actually measures the electrical quantity of interest, in the case of a watt-hour meter the integral with respect to time of the circuit power, and actuates the register section can take various forms as is known in the art.

In FIG. 1, the remote reading register 10 of a kilowatt-hour meter is shown at approximately four times actual size. Register 10 has a front plate 11 and a parallel back plate 12, and adjacent the front plate are a plurality of indicator gears 13a–13e, only some of which are shown in this view, that are respectively secured for rotation with one of a set of indicator shafts 14a–14e extending between the front plate and the back plate. As is further described in the previously mentioned application Ser. No. 348,745, the indicator gears 13a–13e form a decade gear train in which the lowest order gear and indicator shaft are rotatably coupled to an input gear drive assembly, not shown, which is driven by the metering drive shaft of the meter. Also not shown are a set of manually readable dials mounted on the exterior face of front plate 11 at the respective forward ends of the indicator shaft 14a–14e. Due to the gear ratio, the rotational positions of the indicator shafts and of the manually readable dials correspond to the respective digit positions of a five-digit kilowatt-hour readout.

The remainder of the space between the front and back plates 11 and 12, which typically are spaced apart less than one inch, is taken up by the remote reading optical encoder means. Referring also to FIG. 2, the five indicator shafts 14a–14e are arranged in a semicircular pattern at the same radial distance from a common center point C, spaced angularly 45° from one another. A set of circular, thin metal, optical encoding discs 15a–15e are respectively fixed for rotation with the indicator shafts 14a–14e. Each of the encoding discs has a pattern of arcuate slots and apertures 16 in a plurality of concentric rings arranged to permit binary code readout of the rotational position of its respective indicator shaft. To facilitate rapid readout which need take only a few seconds each month or other billing period, a central scanning disc 17 is provided that is rotatable about a bearing shaft mounted at the center point C. The bearing shaft 18 (FIG. 1) projects inwardly from the back plate 12 and supports a rotatable bearing member 19 to which the scanning disc 17 is rigidly attached. The scanning disc 17 is cupped and has a thin continuous band of high hysteresis loss ferromagnetic material 20 secured to the inside of the rim which, as is explained in detail later, forms the rotor of the actuating motor.

The face of scanning disc 17 has a series of relatively small, rotationally staggered apertures 21 (FIG. 2) at different radial distances from the center C. These scan apertures 21 can be said to be in a spiral pattern and facilitate readout of the binary information corresponding to the rotational positions of encoding discs 15a–15e. The back plate 12 further has a set of five spoke-like slits 22, spaced angularly at 45° from one another, so that only one of the encoding discs is read at a time. To enable the passage of light to a photosensor, indicating either a binary "one" or "zero", coincidence is required as to an aperture 16 in an encoding disc, a scan aperture 21 in the scanning disc, and the corresponding reading slit 22 in back plate 12. The five encoding discs 15a–15e are scanned sequentially during one revolution of the scanning disc 17.

The optical system associated with the remote reading optical encoder means includes a light source and collimating optics for producing collimated light that illuminates substantially the entire area of the scanning disc 17. To this end, an incandescent lamp 23 is mounted centrally of a parabolic reflector member 24 for projecting parallel light rays. To support these components, a central mount 25 is fastened to the front plate 11 in alignment with the bearing shaft 18 and has a central bore for receiving the incandescent lamp 23.

The parabolic reflector 24 is secured to a flange on the central mount 25 by fasteners 26, and preferably is a clear plastic member having suitably silver or aluminum coated reflecting surfaces. The stator 27 of the hollow core hysteresis motor, which is primarily the subject of this invention, is mounted on and surrounds the parabolic reflector 24. The collecting optics of the optical system includes a collector member 28 mounted on the other surface of back plate 12 centered about the bearing shaft 18 for the scanning disc 17. This is preferably a clear plastic Cassegrainian reflector having an outer primary reflective surface and an inner secondary reflective surface for focusing any of the transmitted read-out light pulses onto a single photosensor assembly 29 mounted on the outer surface of the collector at its center. A single photosensor device, such as a photocell or other solid state photosensitive device, receives all of the transmitted light pulses from the five encoding discs and produces a serial electrical output signal in the form of a train of electrical pulses. After decoding at a remotely located central station, the reading of the kilowatt-hour meter is derived from the transmitted information.

Further information on the remote reading optical encoder means and its associated optical system can be obtained from the previously mentioned applications Ser. No. 348,745 and Ser. No. 348,513. In the first of these, in FIG. 5, it is shown that the stator winding in motor stator 27 and the incandescent lamp 23 are energized simultaneously by the closing of a relay in response to an electrical signal originating at the remotely located central station and transmitted over telephone, power, or coaxial lines to the particular meter being read. One of the desirable electrical performance characteristics of the scanning disc drive system is that it is brought up to synchronous speed in a relatively short time (approximately 100–200 milliseconds).

The drive system for scanning disc 17 is provided by an unsymmetrical, hollow core, shaded pole, synchronous hysteresis motor. An important feature of the invention is that the scanning disc 17 is part of the motor rotor and supports or provides the ferromagnetic material 20 having a high hysteresis loss to enable the production of torque. Another important feature of the invention is that it fits within the available remaining space in the optical remote reading meter register, and is unsymmetrical since it surrounds or is mounted on the exterior frustoconical side of the parabolic reflector 24. A shaded pole stator is used to produce an approximately constant rotating magnetic field, and enables the motor to start and run efficiently. For this application, a low cost construction suitable for high volume fabrication is essential.

In its preferred form, the stator 27 of the drive system is comprised by seven different components that are stacked or nested one upon the other as is evident in the cross-sectional view of FIG. 1. In order, these are identified as a first shaded pole stator lamination and hollow core member 30, a first shading ring 31, a first unshaded pole stator lamination 32, a stator winding 33, a second unshaded pole stator lamination 34, a second shading ring 35, and a second shaded pole stator lamination 36. While either stator lamination and shading ring assembly can provide the north stator poles and the other the south stator poles, for convenience the elements 30–32 are referred to as the north stator pole components and the elements 34–36 as the south stator pole components. The shaded pole stator lamination 30 has an integrally formed frusto-conical hollow core 30a conforming to the shape of the parabolic reflector 24 on which it is mounted, and a flange 30b by means of which the member is fastened to the flange on the central mount 25.

Referring to the exploded perspective view of the hollow core hysteresis motor shown in FIG. 3, the stator lamination and core member 30 further has a set of five, equally spaced, relatively narrow, orthogonally bent fingers 30' that provide the shaded north pole structures per se. This part, as well as the other stator laminations, is made of a common medium grade soft steel and are suitable for fabrication as stampings. The shading rings 31 and 35 are made of solid copper and have approximately the same mass, so that the larger inner diameter ring 31 is about twice as thick as the smaller inner diameter ring 35. The stator lamination 32 is essentially a simple ring with a set of five peripheral, orthogonally bent, fingers 32' providing the unshaded north stator pole structures. This can be fabricated from a washer-type stamping with the additional step of bending over the fingers. The remaining stator laminations 34 and 36 are similar to element 32 with the exception that the inner diameters of the rings are progressively smaller and the respective bent over stator pole fingers 34' and 36' are progressively longer. When assembled (see FIG. 4) the tips of all the stator pole fingers are in approximately the same plane. The ring-like stator excitation winding assembly 33 includes a plastic bobbin or spool 33a on which is wound a single concentrated stator winding 33b made of copper wire. This motor is preferably designed for single phase, 60 Hz, 24-volt excitation, but other supply voltages can be used depending on the application and the performance desired.

The cupped scanning disc 17 is suitably made of thin aluminum metal to obtain a fast start-up time, which is approximately proportional to rotor inertia. For the preferred application being described, the high hysteresis loss ferromagnetic band 20 attached to the inside of the rim is made of vanadium Permendur. Permendur is a trademark of the Allegheny Ludlum Steel Corp. for their cobalt-iron alloy for high flux density applications. Vanadium Permendur is an alloy consisting essentially of 2 percent vanadium, 48 percent cobalt, and 50 percent iron. As made by another manufacturer, the proportions of the alloy are 2 percent vanadium, 49 percent cobalt, and 49 percent iron. Where the requirements are different, other alloys that have been used for the rotors of hysteresis motors, usually containing a high percentage of cobalt, can be selected. It may be necessary to anneal the rotor such that there is a moderate coercive force and a large peak flux density associated with the hysteresis loop. This is to minimize the tendency of the rotor flux to magnetize the rotor as a permanent magnet rotor with the number of rotor poles equal to the stator poles. This phenomenon is beneficial since it adds torque to the hysteresis torque at synchronous speed but detracts from the start-up performance of the motor since the rotor poles tend to latch onto the stator iron. Proper selection of the air gap also minimizes the latching effect.

When the separate stator components are assembled in stacked relation as shown in FIG. 4, the finger-like salient stator poles are staggered or interleaved among one another. The 20 salient stator poles, including five pairs of unshaded and shaded north stator poles and five pairs of unshaded and shaded south stator poles are equally spaced around the ring at an angle of 36° from one another. The width of the salient stator poles is preferably such that the air gap between adjacent fingers is small. The sequential arrangement of the salient stator poles determines whether the scanning disc 17 rotates in a clockwise or a counterclockwise direction. As shown in FIG. 4, reading clockwise, the sequence is an unshaded N pole 32', a shaded N pole 30', an unshaded S pole 34', and a shaded S pole 36', etc., which produces clockwise rotation of the scanning disc 17. For a ten pole motor of this type with 60 Hz excitation, the motor speed is 720 rpm. A lesser or greater number of stator poles can be used, of course, but a ten pole motor is selected for this application since it gives the desired pulse spacing resolution.

The operation of the hollow core hysteresis motor will be described only briefly. In any given half cycle of the applied voltage, the changing magnetic flux passing through either shading ring 31 and 35 induces a voltage in the shading ring which causes a current to flow. Such a current always builds up a flux which opposes the flux that caused it. As a result, there is a phase shift in the flux such that the shaded stator pole flux builds up an instant later. This action occurs at each pair of unshaded and shaded poles, and with both increases and decreases in the flux as it goes through its cycle. The rotor rotates in a direction from an unshaded stator pole towards a shaded stator pole. The shaded pole stator taken as a whole produces an approximately constant rotating magnetic field. This magnetomotive force induces currents in the continuous cylindrical rotor band 20 which lag the inducing magnetomotive force by an angle proportional to the hysteresis loss, this angle being the torque angle. Thus, flux from a south unshaded stator pole passes circumferentially through the vanadium Permendur band 20 to a north unshaded stator pole. Assuming no cross linkage of the flux, the same is true of the shaded pole flux. Ideally, the motor torque is proportional to the fundamental component of stator magnetomotive force, the fundamental component of rotor flux, and the sine of the torque angle. As was previously mentioned, voltage is applied to the motor during the reading interval, which may require as little as two seconds a month, upon the closing of a relay by command from the remotely located central station. The motor has a rapid start-up and reaches the synchronous speed of 720 rpm in a relatively short time (about 100–200 milliseconds). The encoding discs 15a–15e can be read in a single revolution of the scanning disc 17, however, several revolutions may be required for redundant transmission of read-out signals for error detection purposes.

Several modifications of the preferred construction are possible. As described, all of the unshaded and shaded salient poles are equally spaced, but it would actually be preferable that the mechanical angle between an unshaded pole and its corresponding shaded pole be made equal to the actual phase angle in equivalent electrical degrees to produce a relatively smooth rotating magnetomotive force. With the type of shading rings being used, a 35°–45° phase shift is about the most that can be produced with a reasonable amount of copper. Further, the stator lamination and shading ring assembly at either side of the stator winding assembly 33 may include only one stator lamination having five pairs of orthogonally bent unshaded and shaded stator pole fingers. In this case, the shading ring has a more complex shape including apertures through which the stator pole fingers are inserted and a bent-over, peripheral lip.

In summary, the improved scanning disc drive system for an automatic meter reader encoder is built into the available space in the meter register surrounding the reflector in the optical encoder system and uses the read-out scanning disc as part of the rotor. The hollow hysteresis motor is low cost with an unsymmetrical stator made of stacked stator lamination, shading ring, and excitation winding components, and meets the desired performance characteristics including fast start-up to synchronous speed.

While the invention has been particularly shown and described with reference to a preferred embodiment thereof, it will be understood by those skilled in the art that the foregoing and other changes may be made therein without departing from the spirit and scope of the invention.

What I claim as new and desire to secure by Letters Patent of the United States is:

1. A remotely reading meter register comprising
    optical encoder means for producing a remotely readable electrical output signal indicative of the rotational positions of a plurality of coupled meter register indicator shafts,
    said optical encoder means comprising a light source mounted at least partially within a reflector member shaped to project collimated light, and a rotatable apertured scanning disc operable selectively to transmit the collimated light to a photosensor means in the form of a train of read-out light pulses which are converted by said photosensor means into said electrical output signal, and
    a scanning disc drive system comprising a hollow core hysteresis motor which includes an annular stator closely surrounding said reflector member and scanning disc and driving a rotor provided by a portion of said scanning disc.

2. A meter register according to claim 1 wherein said scanning disc is cupped and provided with a cylindrical rim comprising a continuous band of cobalt alloy ferromagnetic material.

3. A meter register according to claim 2 wherein said stator comprises a single concentrated excitation winding and a pair of annular stator lamination and shading ring assemblies, each of said stator lamination and shading ring assemblies having at least one unshaded and shaded salient stator pole arranged in a ring surrounding said cylindrical rim so as to provide in combination an approximately constant rotating magnetic field.

4. A meter register according to claim 3 wherein each of said stator lamination and shading ring assemblies includes an unshaded pole lamination, a shading ring, and a shaded pole lamination, each of said laminations having at least one orthogonally bent finger providing said salient stator poles.

5. A remote reading meter register comprising
    optical encoder means for producing a remotely readable electrical output signal indicative of the rotational positions of a plurality of coupled meter register indicator shafts,
    said optical encoder means comprising a light source and associated conically shaped reflector member for projecting collimated light, a rotatable cupped scanning disc mounted coaxially with said reflector member, a plurality of encoding discs each secured for rotation with one of said indicator shafts, and a collecting optics and photosensor assembly, said scanning disc being operable selectively to transmit the collimated light through aligned apertures at least in said scanning and encoding discs in the form of a train of read-out light pulses which are incident on said collecting optics and photosensor assembly and converted to said electrical output signal, and
    a scanning disc drive system comprising an unsymmetrical, hollow core, shaded pole, synchronous hysteresis motor which includes an annular stator closely surrounding said reflector member and cupped scanning disc, said scanning disc having a cylindrical rim comprising a continuous band of cobalt alloy ferromagnetic material for providing a rotor driven by said stator.

6. A meter register according to claim 5 wherein said stator comprises a single concentrated excitation winding between a pair of stator lamination and shading ring assemblies, each of said stator lamination and shading ring assemblies having at least one unshaded and shaded salient stator pole arranged in a ring about said cylindrical rim and in combination generating an approximately constant rotating magnetic field.

7. A meter register according to claim 6 wherein each of said stator lamination and shading ring assemblies includes an unshaded pole lamination, a shading ring, and a shaded pole lamination, said laminations each having a plurality of orthogonally bent fingers of different lengths that are interleaved to provide said salient stator poles.

8. A meter register according to claim 7 wherein one of said shaded pole laminations has an integral curved hollow core member for receiving said stator laminations, shading rings, and excitation winding in stacked relation, and mounting said stator about said reflector member.

* * * * *